United States Patent [19]

Tsuboi

[11] 4,346,945

[45] Aug. 31, 1982

[54] MULTIPURPOSE RECIPROCAL BEARING UNIT

[76] Inventor: Nobuyuki Tsuboi, 2-1, Okayama 5-Chome, Shijonawate City, Osaka, Japan, 575

[21] Appl. No.: 191,645

[22] Filed: Sep. 26, 1980

[51] Int. Cl.³ ............................................. F16C 29/04
[52] U.S. Cl. .................................. 308/6 R; 308/203; 308/244
[58] Field of Search ............... 308/6 R, 6 A, 6 B, 3 A, 308/3 R, 3.5, 244, 203, 204

[56] References Cited

U.S. PATENT DOCUMENTS

| | | | |
|---|---|---|---|
| 3,347,603 | 10/1967 | Ignatjev | 308/6 B |
| 3,622,211 | 11/1971 | Mitton | 308/6 R |
| 3,674,324 | 7/1972 | Schweizer et al. | 308/6 R |
| 3,884,051 | 5/1975 | Bottoms | 308/6 A X |

*Primary Examiner*—Frederick R. Schmidt
*Assistant Examiner*—Daniel P. Stodola
*Attorney, Agent, or Firm*—Jordan and Hamburg

[57] ABSTRACT

A reciprocal bearing unit to be provided between a shaft and a support member includes a plurality of thin members so layered in the axial direction of the shaft as to form a casing with a plurality of recessions in which a plurality of rollers are so arranged as to be rotatable in the axial direction of the shaft, the shaft being inserted through a central aperture of the casing either in a fixed or in a movable relation.

13 Claims, 16 Drawing Figures

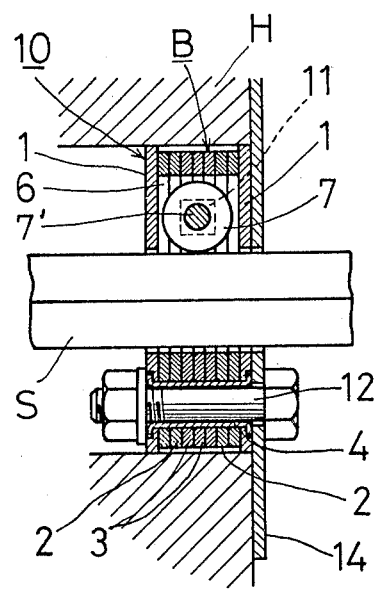
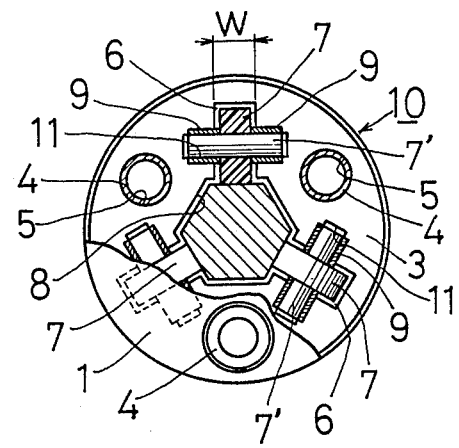
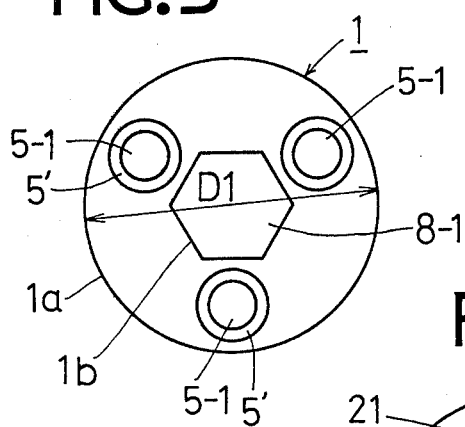
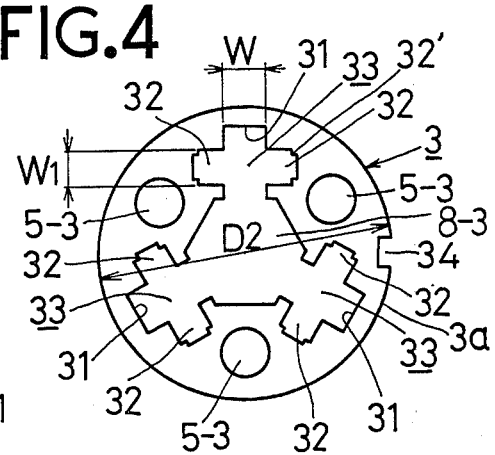
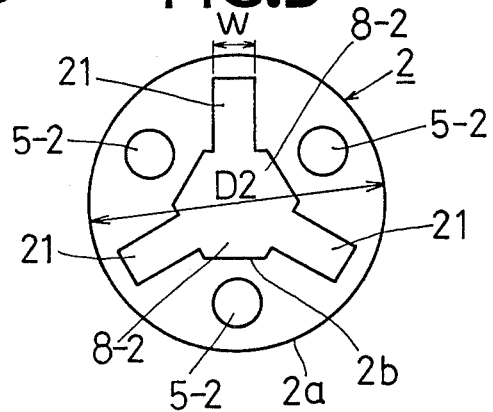

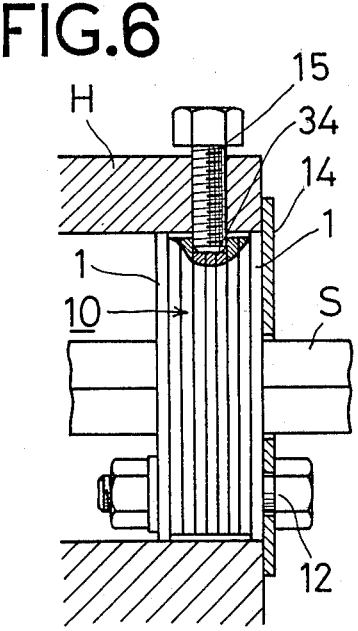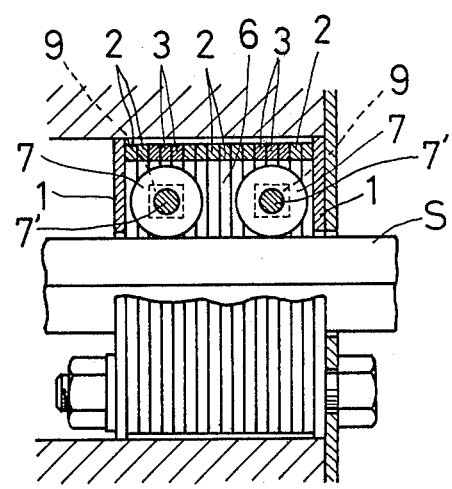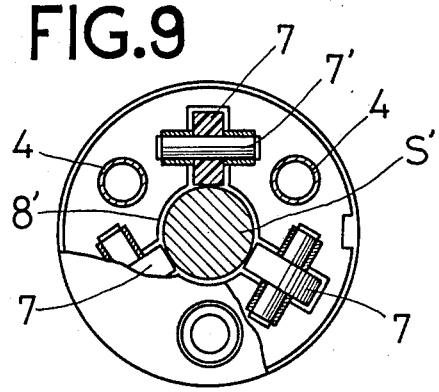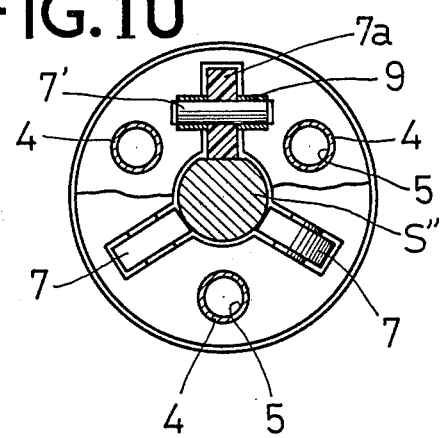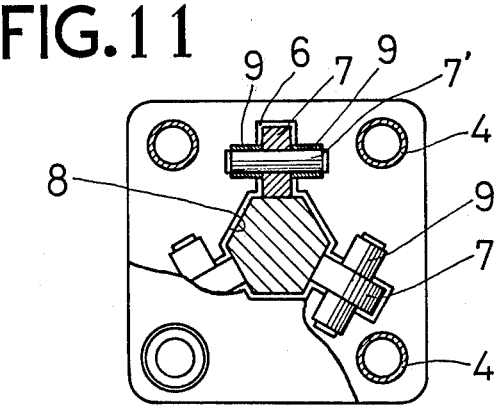

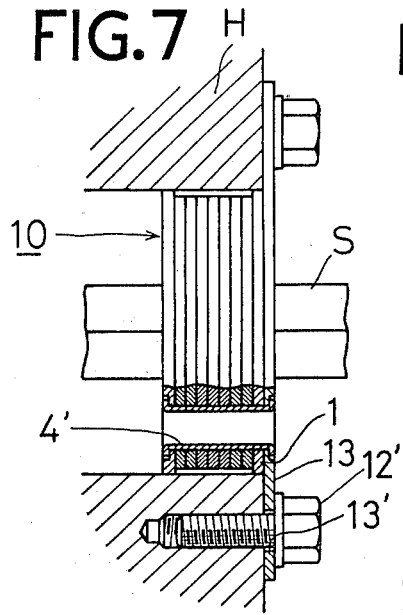
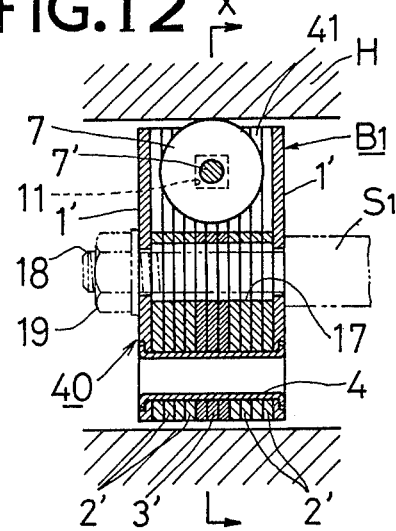
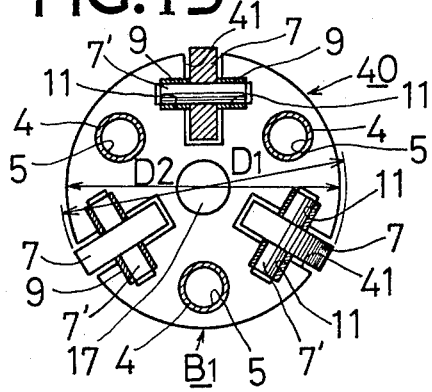
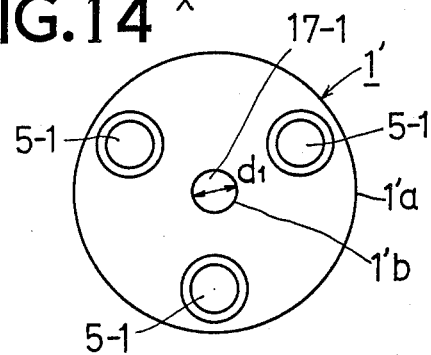
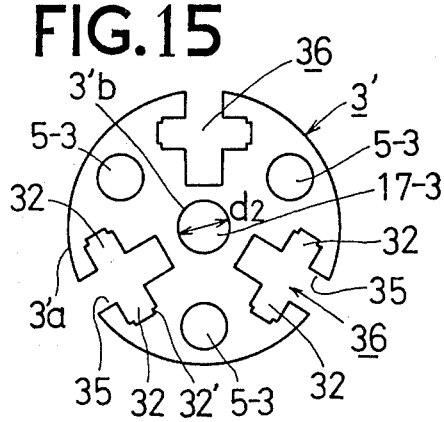
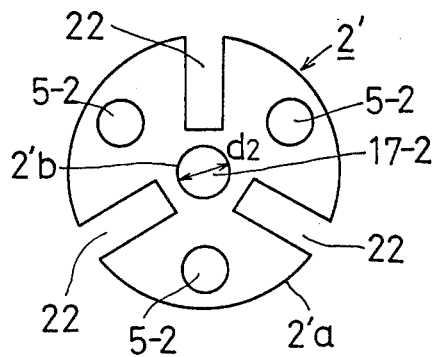

MULTIPURPOSE RECIPROCAL BEARING UNIT

BACKGROUND OF THE INVENTION

The present invention relates to a bearing device, and more particularly to a reciprocal bearing to be provided between a shaft member and a substantially cylindrical member through which the shaft member is inserted in a reciprocally movable relation to the cylindrical member.

Conventionally such a reciprocal bearing usually has a plurality of ball means arranged axially between the shaft member and the cylindrical member. It has hitherto been desired to provide a different type of reciprocal bearing to meet a variety of need.

SUMMARY OF THE INVENTION

A main object of the invention is to provide a multipurpose reciprocal bearing unit suitable for quantity production and workable with high efficiency.

A more specific object of the invention is to provide a reciprocal bearing unit having a plurality of substantially annular thin members so layered in the axial direction of a shaft member as to form a casing, and also having a plurality of rollers so arranged in peripheral recessions of the casing as to rotate freely in the above-mentioned axial direction.

Another object of the invention is to provide a reciprocal bearing unit which can be manufactured and assembled easily with high accuracy.

A further object of the invention is to provide a reciprocal bearing unit which can be made to various configurations and dimensions with ease.

A further object of the invention is to provide a reciprocal bearing unit which permits of easy setting, light running and negligible maintenance.

Other objects and advantages of the invention will be readily appreciated as they become better understood hereinafter when considered in connection with the accompanying drawings in which:

BRIEF DESCRIPTION OF THE DRAWINGS

FIG. 1 is a front view shown in vertical section of a reciprocal bearing unit embodying the invention;

FIG. 2 is a partially sectioned side view of the embodiment in FIG. 1;

FIG. 3 is a side view of a side annular member of the embodiment in FIG. 1;

FIG. 4 is a side view of a middle annular member of the embodiment in FIG. 1;

FIG. 5 is a side view of an intermediate annular member of the embodiment in FIG. 1;

FIG. 6 is a partially sectioned front view of the embodiment in FIG. 1, when set with screw members in a cylindrical member.

FIG. 7 shows a modification of the embodiment in FIG. 6;

FIG. 8 shows a modification of the embodiment in FIG. 1;

FIG. 9 shows a modification of the embodiment in FIG. 2;

FIG. 10 shows another modification of the embodiment in FIG. 2;

FIG. 11 shows still another modification of the embodiment in FIG. 2;

FIG. 12 is a front view shown in vertical section of another embodiment;

FIG. 13 is a cross section taken approximately on the line X—X in FIG. 12;

FIG. 14 is a side view of a side annular member of the embodiment in FIG. 12;

FIG. 15 is a side view of a middle annular member of the embodiment in FIG. 12; and FIG. 16 is a side view of an intermediate annular member of the embodiment in FIG. 12.

DESCRIPTION OF THE PREFERRED EMBODIMENTS

Referring to FIGS. 1 & 2, the reciprocal bearing unit embodying the invention is wholly designated as B, and is provided between a shaft S and a cylindrical member H through which the shaft S is inserted in a reciprocally movable relation to it.

The reciprocal bearing unit B has a plurality of annular thin members 1, 2 & 3 layered in the axial direction of shaft S. They are united together with hollow rivets 4, and thus form an annular casing 10 of the bearing unit B.

The casing 10 has a circular outer periphery and a hexagonal inner periphery which defines a hexagonal central aperture 8. The casing 10 is set in the cylindrical member H in a fixed relation to it. The shaft S has a hexagonal cross section, and is inserted through the central aperture 8 of casing 10 in a reciprocally movable relation to it.

The reciprocal bearing unit B also has three rollers 7 provided in recessions 6 extending radially from the inner periphery of casing 10.

Each roller 7 is supported with a pin 7' in a freely rotatable relation to it, and each pin 7' is supported with a pair of journal bearings 9 in a freely rotatable relation to them. The pins 7' and journal bearings 9 are provided in recessions 11 traversing the radial recessions 6 at right angles with them respectively. Each journal bearing 9 is in a stationarily supported relation to the corresponding traversal recession 11.

Thus the rollers 7 are freely rotatable in the axial direction of shaft S in relation to the casing 10. And the rollers 7 are in a freely slidable relation to the shaft S as the shaft S reciprocates through the central aperture 8 of casing 10.

The annular member 1 has the configuration best shown in FIG. 3. It has a circular outer periphery 1a with a diameter "D1" and a hexagonal inner periphery 1b which defines a hexagonal central aperture 8-1. The diameter "D1" is practically equal to the inner diameter of cylindrical member H. The central aperture 8-1 is similar to, but slightly larger than, the hexagonal cross section of shaft S.

Each annular member 1 is provided with three rivet holes 5-1 opposite every other side of the hexagonal inner periphery 1b. Each rivet hole 5-1 is provided with a spot face 5'.

The annular member 2 has the configuration best shown in FIG. 5. It has a circular outer periphery 2a with a diameter "D2" and a hexagonal inner periphery 2b which defines a hexagonal central aperture 8-2. The diameter "D2" is slightly smaller than "D1". The hexagonal central aperture 8-2 has the same shape, size and position as 8-1.

Each annular member 2 is provided with three rectangular slots 21 extending radially from every other side of the hexagonal inner periphery 2b. The radial slots 21 have a given width "W" and length.

Each annular member 2 is also provided with three rivet holes 5-2 correspondingly to 5-1 in a circumferentially alternate relation to the radial slots 21.

The annular member 3 has the configuration best shown in FIG. 4. It has a circular outer periphery 3a with the same diameter "D2" as 2a, and also has a hexagonal inner periphery 3b which defines a hexagonal central aperture 8-3 with the same shape, size and position as 8-2.

Each annular member 3 is provided with three rectangular slots 31 extending radially from every other side of the hexagonal inner periphery 3b. The radial slots 31 have the same shape, size and position as 21. Each annular member 3 is also provided with three rectangular slots 32 traversing the radial slots 31 at right angles with them respectively. Thus each radial slot 31 and the corresponding traversal slot 32 form a cross 33. The traversal slots 32 have a given width "W1" and length.

In addition, each annular member 3 is provided with three rivet holes 5-3 correspondingly to 5-2 in a circumferentially alternate relation to the radial slots 31. Each traversal slot 32 is provided with stepping ends 32'. The outer periphery 3b is provided with an indent 34.

The casing 10 is composed with a pair of the annular members 1 at both sides, a plurality of the annular members 3 in the middle portion and a plurality of the annular members 2 intermediate 1 & 3. All the annular members 1, 2 & 3 have a given thickness.

The central apertures 8-1, 8-2 & 8-3 of annular members 1, 2 & 3 are layered together to be the central aperture 8 of casing 10. The rivet holes 5-1, 5-2 & 5-3 of annular members 1, 2 & 3 are layered together to be the rivet holes 5 of casing 10 respectively. The radial slots 21 & 31 of annular members 2 & 3 are layered together to be the radial recessions 6 of casing 10 respectively. The traversal slots 32 of annular members 3 are layered together to be the traversal recessions 11 of casing 10 respectively.

The journal bearing 9 has an outer periphery of square cross section, each side of the square being "W1" that is equal to the width of traversal slot 32 shown in FIG. 4. And the overall thickness of annular members 3 employed is equal to "W1"; for instance, three annular members 3, each 1 mm thick, are employed in case "W1" is 3 mm.

A cover member 14 is attached to the casing 10 on one end of the cylindrical member H by utilizing bolts 12 through the hollow rivets 4 as shown in FIGS. 1 & 6, where only one of the bolts 12 is illustrated. The casing 10 is fixed to the cylindrical member H with set screws 15 provided in an engaging relation to the indents 34 of annular members 3.

The annular members 1, 2 & 3 are usually made by punching a rigid thin plate material, such as metal and synthetic resin, of a given thickness. Therefore a large number of such annular members can be easily manufactured with high accuracy in shape and size at substantially low cost.

The rollers 7 are usually made of synthetic resin or oil-less metal. These materials require no lubrication and therefore there will be no need of maintenance during the service of such rollers.

The bearing unit B can be assembled with ease merely by layering the annular members 1, 2 & 3 one after another, inserting the rivets 4 through the holes 5, and putting the rollers 7 together with pins 7' and journal bearings 9 into the recessions 6 & 11 during the layering of annular members 2 & 3. And it will facilitate putting the journal bearings 9 into the recessions 11 firmly that the outer periphery of each journal bearing 9 has a square cross section.

Since the annular members 1, 2 & 3 are shaped and sized with high accuracy, they can be united together into the casing 10 with excellent alignment and integrality merely by inserting the rivets 4 through the holes 5. Thus the casing 10 can be assembled easily with high accuracy.

The casing 10 can be set in the cylindrical member H with ease merely by tightening the bolts 12 and set screws 15. And it will facilitate setting the casing 10 in the cylindrical member H that the diameter "D2" of annular members 2 & 3 is slightly smaller than "D1" of annular members 1. Moreover, the high accuracy in shape, size and assembling of casing 10 will permit of setting it in the cylindrical member H with high accuracy.

The high accuracy in shape, size, assembling and setting will put the bearing unit B in an accurate working relation to the shaft S. And the rollers 7 can always rotate freely in the exact axial direction of shaft S unlike the conventional ball means. Thus the bearing unit B can always run lightly along the shaft S, even though the shaft surface is not finished accurately.

It may be good that the casing 10 is fixed to the cylindrical member H as shown in FIGS. 7 instead of FIG. 6. In FIG. 7 the casing 10 and a cover member 13 are united together with rivets 4', and the cover member 13 is fixed to the cylindrical member H with bolts 12' through holes 13' provided for this purpose in the cover member 13. In this case, it is not necessary to provide the indent 34 in the outer periphery 3a of annular member 5 because the set screws 15 are not utilized.

The length of bearing unit B can be increased desiredly with ease by employing a plurality of rollers 7 axially in series together with the correspondingly increased number of annular members 2 & 3 as shown in FIG. 8.

It may be good that a plurality of bearing units B are connected in series with spacer means (not shown) being provided intermediately to increase the overall length of bearing units B desiredly with ease.

Since the annular members 1, 2 & 3 are made by punching, various desired configurations of such members can be made with ease as shown in FIGS. 9, 10 & 11.

In FIG. 9 each annular member has a circular inner periphery, and thus the casing of bearing unit B has a circular central aperture 8' through which a shaft S' with a circular cross section is inserted in a reciprocally movable relation to it.

Also in FIG. 10 each annular member has a circular inner periphery and thus the casing of bearing unit B has a circular central aperture. In this case, however, a shaft S" with a partially circular and partially linear cross section is inserted through the circular central aperture of casing in a reciprocally movable relation to it. One of the rollers, which is designated as 7a and corresponds to the linear part of shaft cross section, has a larger diameter than the other two rollers 7. And the radial recession corresponding to the roller 7a has a larger length than the other two, in other words, each of the annular members 2 & 3 has a radial slot longer than the other two radial slots.

In FIG. 11 each annular member is replaced with a similar member having a substantially square outer periphery, and thus the bearing unit B has a substantially prismatic casing to be set in a substantially prismatic member in place of the cylindrical member H.

It may be good to provide more than three rollers 7 circumferentially, each with a pin 7' and a pair of journal bearings 9, in the correspondingly increased radial and traversal recessions in the casing of bearing unit B.

One or more of the rollers 7 may be made of a material different from the others. It is possible to employ minature roller bearings as the rollers 7.

The shaft S and the cylindrical member H may be a part of almost any equipment. They may have almost any other configurations than the above-described, so long as they are parallel with each other and movable in the axial direction of shaft in relation to each other.

The embodiment shown in FIGS. 12 through 16 is fundamentally similar to the embodiment shown in FIGS. 1 through 6, except that the former is of the type having rollers in recessions provided in the outer periphery of an annular casing whereas the latter is of the type having rollers in recessions provided in the inner periphery of an annular casing. The like numbers indicate the like members.

Referring to FIGS. 12 & 13, the reciprocal bearing unit embodying the invention is wholly designated as B1, and is provided between a shaft S1 and a cylindrical member H through which the shaft S1 is inserted in a reciprocally movable relation to it.

The reciprocal bearing unit B1 has a plurality of annular thin members 1', 2' & 3' layered in the axial direction of shaft S1. They are united together with hollow rivets 4, and thus form an annular casing 40 of the bearing unit B1.

The casing 40 has a circular outer periphery and a circular inner periphery which defines a central aperture 17. The casing 40 is set on the shaft S1 in a fixed relation to it. The shaft S1 has an end portion 18 with a circular cross section smaller than the middle portion, and the end portion 18 is inserted through the central aperture 17 of casing 40 in a fixed relation to it.

The reciprocal bearing unit B1 also has three rollers 7 provided in recessions 41 extending radially from the outer periphery of casing 40.

Each roller 7 is supported with a pin 7' in a freely rotatable relation to it, and each pin 7' is supported with a pair of journal bearings 9 in a freely rotatable relation to them. The pins 7' and journal bearings 9 are provided in recessions 11 traversing the radial recessions 41 at right angles with them respectively. Each journal bearings 9 is in a stationarily supported relation to the corresponding traversal recessions 11.

Thus the rollers 7 are freely rotatable in the axial direction of shaft S1 in relation to the cylindrical member H. And the rollers 7 are in a freely slidable relation to the cylindrical member H as the shaft S1 reciprocates through the cylindrical member H.

The annular member 1' has the configuration best shown in FIG. 14. It has a circular inner periphery 1'b with a diameter "d1" and a circular outer periphery 1'a with a diameter "D2" (shown in FIG. 13). The inner periphery 1'b defines a circular central aperture 17-1. The diameter "d1" is practically equal to the diameter of shaft end portion 18. The diameter "D2" is slightly smaller than "D1" that is practically equal to the inner diameter of cylindrical member H, as shown in FIG. 13.

Each annular member 1' is provided with three rivet holes 5-1 opposite three points (not shown) which divide the circular outer periphery 1'a equally as shown in FIG. 14.

The annular member 2' has the configuration best shown in FIG. 16. It has a circular inner periphery 2'b with a diameter "d2" and a circular outer periphery 2'a with the same diameter "D2" as 1'a. The inner periphery 2'b defines a circular central aperture 17-2 with the same size and position as 17-1. The diameter "d2" is slightly larger than "d1".

Each annular member 2' is provided with three rectangular slots 22 extending radially from three points (not shown) which divide the circular outer periphery 2'a equally. The radial slots 22 have a given width and length.

Each annular member 2' is also provided with three rivet holes 5-2 correspondingly to 5-1 in a circumferentially alternate relation to the radial slots 22.

Each annular member 3' has the configuration best shown in FIG. 15. It has a circular inner periphery 3'b with the same diameter as 2'b and also a circular outer periphery 3'a with the same diameter "D2" as 2'a. The inner periphery 3'b defines a circular central aperture 17-3 with the same size and position as 17-2.

Each annular member 3' is provided with three rectangular slots 35 extending radially from three points (not shown) which divide the circular outer periphery 3'a equally. The radial slots 35 have the same shape, size and position as 22. Each annular member 3' is also provided with three rectangular slots 32 traversing the radial slots 35 at right angles with them respectively. Thus each radial slot 35 and the corresponding traversal slot 32 form a cross 36. The traversal slots 32 have a given width and length.

In addition, each annular member 3' is provided with three rivet holes 5-3 correspondingly to 5-2 in a circumferentially alternate relation to the radial slots 35. Each traversal slot 32 is provided with stepping ends 32'.

The casing 40 is composed with a pair of the annular members 1' at both sides, a plurality of the annular members 3' in the middle portion and a plurality of the annular members 2' intermediate 1' & 3'. All the annular members 1', 2' & 3' have a given thickness.

The central apertures 17-1, 17-2 & 17-3 of annular members 1', 2' & 3' are layered together to be the central aperture 17 of casing 40. The rivet holes 5-1, 5-2 & 5-3 of annular members 1', 2' & 3' are layered together to be the rivet holes 5 of casing 40 respectively. The radial slots 22 & 35 of annular members 2' & 3' are layered together to be the radial recessions 41 of casing 40 respectively. The traversal slots 32 of annular member 3' are layered together to be the traversal recessions 11 of casing 40 respectively.

The journal bearing 9 has an outer periphery of square cross section, each side of the square being equal to the width of traversal slot 32. And the overall thickness of annular members 3' employed is equal to the width of traversal slot 32; for instance, three annular members 3', each 1 mm thick, are employed in case the width of traversal slot 32 is 3 mm.

The casing 40 is fixed to the end portion 18 of shaft S1 with a nut 19 as shown in FIG. 12; for this purpose the end portion 18 is threaded partially.

The embodiment shown in FIGS. 12 through 16 can be manufactured and assembled similarly to the embodiment shown in FIGS. 1 through 6. Both embodiments will work with high efficiency for a great variety of purposes because of all the above-mentioned features and advantages.

It will be understood that further modifications may be made in the constructions of the above-given embodiments, and that the invention is in no way limited to the above-given embodiments.

What I claim is:

1. A reciprocal bearing device to be provided between a shaft member and a support member, comprising a plurality of substantially thin members layered in an axial direction of said shaft member in a manner to form a casing, said thin members having a central aperture and a plurality of securement-receiving openings disposed about said central aperture, a plurality of some of said thin members also having a plurality of first openings disposed about said central aperture, said first openings having a roller accommodating portion and a bearing accommodating portion, a plurality of other of said thin members having a plurality of roller accommodating apertures, a plurality of roller means mounted in said casing, said roller means comprising rollers rotatable in bearings, said rollers being received in said roller accommodating apertures and in said roller accommodating portions of said first openings, said bearings being received in said bearing accommodating portions of said first openings, whereby said bearings are fixed non-rotatably in said casing within said bearing accommodating portions of said first openings and said rollers are rotatably in said roller accommodating apertures and in said roller accommodating portions of said first openings.

2. A reciprocal bearing device according to claim 1 further comprising securing means passing through said securement-receiving openings for securing said thin members together.

3. A reciprocal bearing device according to claim 2, wherein said first openings, said roller accommodating apertures and said securement-receiving openings are through holes formed by punching out the respective openings and apertures in said thin members.

4. A reciprocal bearing device according to claim 2, wherein said shaft member is secured to said casing, said casing being disposed within said support member, said rollers extending partially from said casing to engage said support member and reciprocably support said casing and shaft member in said support member.

5. A reciprocal bearing device according to claim 1, wherein said rollers extend partially into said central aperture to engage said shaft member and reciprocably support said shaft member in said central aperture.

6. A reciprocal bearing device according to claim 1, wherein said casing comprises a plurality of first thin members having said first openings and a plurality of second thin members having a plurality of said roller accommodating apertures, said plurality of second thin members being disposed on opposite axial sides of said plurality of first thin members.

7. A reciprocal bearing device according to claim 6, wherein said bearing accommodating portion of said first openings in said plurality of first thin members define axially extending bearing channels for receiving said bearings, said second thin members defining terminating axial ends of said bearing channels.

8. A reciprocal bearing device according to claim 7, wherein said bearings are disposed to have their axes perpendicular to the axis of said shaft member, said bearing channel having a longitudinal axis generally perpendicular to the axis of said shaft member.

9. A reciprocal bearing device according to claim 6, further comprising third thin members disposed on opposite axial sides of said plurality of second thin members, said third thin members having an outside diameter greater than the outside diameter of said plurality of first and second thin members.

10. A reciprocal bearing device according to claim 1, wherein said bearings have an outer polygonal, cross-sectional configuration, said bearing accommodating portions of said first openings having a corresponding polygonal configuration to fixedly receive said bearings.

11. A reciprocal bearing device according to claim 10, wherein said polygonal configuration is a square.

12. A reciprocal bearing device according to claim 1, wherein said thin members have a generally circular outer periphery.

13. A reciprocal bearing device according to claim 1, wherein said thin members have a generally polygonal outer periphery.

* * * * *